(12) United States Patent
Watanabe

(10) Patent No.: US 7,065,749 B2
(45) Date of Patent: Jun. 20, 2006

(54) PROGRAM DEVELOPMENT COMPRESSED TRACE SUPPORT APPARATUS

(75) Inventor: Katsumi Watanabe, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 566 days.

(21) Appl. No.: 09/819,351

(22) Filed: Mar. 28, 2001

(65) Prior Publication Data
US 2001/0054175 A1 Dec. 20, 2001

(30) Foreign Application Priority Data
Mar. 28, 2000 (JP) .............................. 2000-089636

(51) Int. Cl.
G06F 9/44 (2006.01)
(52) U.S. Cl. ...................................... 717/128
(58) Field of Classification Search ................ 717/128; 714/128, 45
See application file for complete search history.

(56) References Cited

U.S. PATENT DOCUMENTS

| | | | | |
|---|---|---|---|---|
| 4,641,348 A | * | 2/1987 | Neuder et al. | 382/100 |
| 5,491,793 A | | 2/1996 | Somasundaram et al. | |
| 5,535,331 A | * | 7/1996 | Swoboda et al. | 714/45 |
| 5,621,886 A | | 4/1997 | Alpert et al. | |
| 5,632,024 A | * | 5/1997 | Yajima et al. | 712/205 |
| 5,740,413 A | | 4/1998 | Alpert et al. | |
| 5,764,885 A | * | 6/1998 | Sites et al. | 714/45 |
| 5,764,994 A | * | 6/1998 | Craft | 717/159 |
| 5,784,585 A | * | 7/1998 | Denman | 712/209 |
| 6,216,213 B1 | * | 4/2001 | Breternitz et al. | 711/170 |
| 6,732,307 B1 | * | 5/2004 | Edwards | 714/724 |

FOREIGN PATENT DOCUMENTS

| | | | |
|---|---|---|---|
| EP | 0 762 280 A1 | | 3/1997 |
| GB | 1 264 066 | | 2/1972 |
| JP | 53-000041 | * | 1/1978 |
| JP | 53-41 | | 1/1978 |
| JP | 59-161746 | * | 9/1984 |
| JP | 2-61731 | | 3/1990 |

(Continued)

OTHER PUBLICATIONS

Moudgill, Mayan, "Techniques for Implementing Fast Processor Simulators", IBM Research Report, Apr. 1998, retrieved from google.com search Apr. 8, 2004.*

(Continued)

Primary Examiner—Wei Zhen
Assistant Examiner—Mary Steelman
(74) Attorney, Agent, or Firm—Scully, Scott, Murphy & Presser, P.C.

(57) ABSTRACT

A program development support apparatus is provided. A CPU executes a target program and outputs instruction address/instruction code data. The event detection section asserts and outputs a section trace start signal upon detecting that the instruction address/instruction code data matches a predetermined instruction address or instruction code set as an event condition in advance. When an instruction code of the instruction address/instruction code data is a branch instruction, or the section trace start signal is active, the trace data generation section outputs an uncompressed instruction address as trace data. When the instruction address is not the branch instruction, and the section trace start signal is not active, the trace data generation section generates a plurality of compressed instruction addresses by compressing the instruction address and then combines the compressed instruction addresses and outputs them as the trace data.

5 Claims, 11 Drawing Sheets

| | FOREIGN PATENT DOCUMENTS | | |
|---|---|---|---|
| JP | 02-0061731 | * | 3/1990 |
| JP | 4-237340 | | 8/1992 |
| JP | 04-237340 | * | 8/1992 |
| JP | 08-161196 | * | 6/1996 |
| JP | 8-161196 | | 6/1996 |
| JP | 11-024958 | * | 1/1999 |
| JP | 11-24958 | | 1/1999 |
| JP | 11-259335 | * | 9/1999 |
| JP | 11-353205 | * | 12/1999 |
| JP | 2001-060162 | * | 3/2001 |

OTHER PUBLICATIONS

Samples, A. Dain, "Mache: No-Loss Trace Compaction", Oct. 1995, retrieved from a google.com search 04/08/204.*

Wu, Le-Chun, Mirani, Rajiv, Patil, Harish, Olsen, Bruce, Hwu, Wne-mei W. "A New Framework for Debugging Globally Optimized Code", p. 181191, May 1999, retrieved from ACM Portal database, Apr. 8, 2004.*

* cited by examiner

| | INSTRUCTION ADDRESS | INSTRUCTION CODE | | NIMONIC |
|---|---|---|---|---|
| | 0x00001000 | 40160004 | | movhi 0x400,r0,r2 |
| | 0x00001004 | 221660f0 | | movea 0xf060,r2r2 |
| | 0x00001008 | 00801734 | loop: | ld.h 0x0080[r0],r20 |
| INSTRUCTION 4 | 0x0000100C | 40160004 | | movhi 0x400,r0,r2 |
| INSTRUCTION 5 | 0x00001010 | 221662f0 | | movea 0xf062,r2,r2 |
| INSTRUCTION 6 | 0x00001014 | 3241 | | add 0x01,r10 |
| INSTRUCTION 7 | 0x00001016 | 629f0000 | | st.h r19,0x0[r2] |
| INSTRUCTION 8 | 0x0000101A | 20168af4 | | movea 0xb76,r0,r2 |
| INSTRUCTION 9 | 0x0000101E | 209e5555 | | movea 0x5555,r0,r19 |
| INSTRUCTION 10 | 0x00001022 | 629f0000 | | st.h r19,0x0[r2] |
| INSTRUCTION 11 | 0x00001026 | 20166ef0 | | movea 0xf06e,r0,r2 |
| ⋮ | ⋮ | ⋮ | | ⋮ |
| INSTRUCTION 20 | 0x00001046 | 221686f4 | | movea 0xf486,r2,r2 |
| INSTRUCTION 21 | 0x0000104A | 209e1111 | | movea 0x1111,r0,r19 |
| INSTRUCTION 22 | 0x0000104E | 629f0000 | | st.h r19,0x0[r2] |
| INSTRUCTION 23 | 0x00001052 | 3a88 | | str 0x08,r7 |
| INSTRUCTION 24 | 0x00001054 | 3241 | | add 0x01,r6 |
| INSTRUCTION 25 | 0x00001056 | 4264 | | cmp 0x04,r8 |
| INSTRUCTION 26 | 0x00001058 | fda6 | | blt loop |
| INSTRUCTION 27 | 0x0000105A | 0000 | | nop |

FIG. 5

FIG. 6A  CLOCK SIGNAL 13

FIG. 6B  INSTRUCTION ADDRESS IN INSTRUCTION ADDRESS/INSTRUCTION CODE DATA 14
INSTRUCTION 25 | INSTRUCTION 26 | INSTRUCTION 3 | INSTRUCTION 4 | INSTRUCTION 5 | INSTRUCTION 6 | INSTRUCTION 7 | INSTRUCTION 8 | INSTRUCTION 9
0x00001056 | 0x00001058 | 0x00001008 | 0x0000100C | 0x00001010 | 0x00001014 | 0x00001016 | 0x0000101A | 0x0000101E

FIG. 6C  INSTRUCTION ADDRESS 27
0x00001056 | 0x00001058 | 0x00001008 | 0x0000100C | 0x00001010 | 0x00001014 | 0x00001016 | 0x0000101A | 0x0000101E

FIG. 6D  BRANCH INSTRUCTION DETECTION SIGNAL 29

FIG. 6E  COMPRESSED INSTRUCTION ADDRESS 31
0x2 | 0x2 | 0x00001008 | 0x4 | 0x4 | 0x4 | 0x4 | 0x4

FIG. 6F  TRACE DATA 32
00000202 | 00020202 | 00001008 | 00000004 | 00000404 | 00040404 | 04040402 | 00000004 | 00000404

FIG. 6G  ALIGNMENT COMPLETION SIGNAL 246

FIG. 6H  TRACE DATA WRITE SIGNAL 34

FIG. 6I  TRACE MEMORY ADDRESS 33
000FF | 00000 | 00001 | 00002

| | TRACE MEMORY ADDRESS | COMPRESSION FLAG | DATA IN TRACE MEMORY | RECONSTRUCTED ADDRESS |
|---|---|---|---|---|
| ⋮ | ⋮ | | ⋮ | ⋮ |
| INSTRUCTION 3 | 00000 | 0 | 0x00001008 | 0X00001008 |
| INSTRUCTION 4 | 00001 | 1 | 0x4 | 0X0000100C |
| INSTRUCTION 5 | 00001 | 1 | 0x4 | 0X00001010 |
| INSTRUCTION 6 | 00001 | 1 | 0x4 | 0X00001014 |
| INSTRUCTION 7 | 00001 | 1 | 0x2 | 0X00001016 |
| INSTRUCTION 8 | 00002 | 1 | 0x4 | 0X0000101A |
| ⋮ | ⋮ | | ⋮ | ⋮ |
| INSTRUCTION 24 | 00006 | 1 | 0x2 | 0X00001054 |
| INSTRUCTION 25 | 00006 | 1 | 0x2 | 0X00001056 |
| INSTRUCTION 26 | 00006 | 1 | 0x2 | 0X00001058 |
| INSTRUCTION 3 | 00007 | 0 | 0x00001008 | 0X00001008 |
| INSTRUCTION 4 | 00008 | 1 | 0x4 | 0X0000100C |
| ⋮ | ⋮ | | ⋮ | ⋮ |

FIG. 7

FIG. 9A CLOCK SIGNAL 13
FIG. 9B INSTRUCTION ADDRESS IN INSTRUCTION ADDRESS/INSTRUCTION CODE DATA 14
FIG. 9C INSTRUCTION ADDRESS 27
FIG. 9D SECTION TRACE START SIGNAL 16
FIG. 9E COMPRESSED INSTRUCTION ADDRESS 31
FIG. 9F TRACE DATA 32
FIG. 9G ALIGNMENT COMPLETION SIGNAL 246
FIG. 9H TRACE DATA WRITE SIGNAL 34
FIG. 9I TRACE MEMORY ADDRESS 33

| | COMPRESSING FLAG | DATA IN TRACE MEMORY | RECONSTRUCTED ADDRESS |
|---|---|---|---|
| INSTRUCTION 7 | 1 | 0x2 | 0X00001016 |
| INSTRUCTION 4 | 0 | 0x0000100C | 0X0000100C |
| INSTRUCTION 5 | 1 | 0x4 | 0X00001010 |
| INSTRUCTION 6 | 1 | 0x4 | 0X00001014 |
| INSTRUCTION 7 | 1 | 0x2 | 0X00001016 |
| INSTRUCTION 4 | 0 | 0x0000100C | 0X0000100C |
| INSTRUCTION 5 | 1 | 0x4 | 0X00001010 |
| INSTRUCTION 6 | 1 | 0x4 | 0X00001014 |
| INSTRUCTION 7 | 1 | 0x2 | 0X00001016 |

FIG. 10

PROGRAM DEVELOPMENT COMPRESSED TRACE SUPPORT APPARATUS

BACKGROUND OF THE INVENTION

The present invention relates to a program development support apparatus and, more particularly, to a program development support apparatus which supports debug of a computer program.

A program development support apparatus is especially used to develop and debug a program for operating a computer apparatus. Particularly, a program development support apparatus having a trace function is used to store an instruction address and instruction code of a CPU (Central Processing Unit), which generally change momentarily as a program is executed, in a memory called a trace memory and analyze them as a program execution result.

In recent years, programs installed in computer apparatuses are becoming complex and bulky, and a trace memory is required to have a large capacity to store a larger amount of execution result. On the other hand, since the operation speed of a CPU increases, a faster memory is necessary. Generally, a program development support apparatus having a trace function need be operated at the same speed as the operation frequency of the CPU. However, since a large-capacity, high-speed memory is very expensive, a decrease in amount of trace data to be stored in the trace memory has been required.

A technique that meets this requirement is disclosed in Japanese Patent Laid-Open No. 11-259335 (reference 1), in which the difference value between the immediately preceding program counter value and the current program counter value is recorded on the trace memory, and only for a branch instruction, the program counter value itself is recorded, thereby compressing the trace data. FIG. 12 shows the conventional program development support apparatus disclosed in reference 1.

Referring to FIG. 12, the program development support apparatus has an evaluation chip 301 prepared for program development and a tracer 302 for storing an instruction trace result. Instruction address/instruction code data output from a CPU 303 in the evaluation chip 301 is latched by an instruction address/instruction code latch circuit 321 in synchronism with a clock signal CLK, and a branch instruction determination circuit 323 determines whether the instruction is a branch instruction.

When the instruction is not a branch instruction, an instruction address data compression circuit 322 compresses the instruction address by generating the difference value between the immediately preceding program counter value and the current program counter value. A trace control circuit 324 combines compressed data of a plurality of instruction addresses into trace data in accordance with the bit width of a trace memory 306. The combined trace data is written in the trace memory 306. If the instruction is a branch instruction, the instruction address is directly written in the trace memory 306 without any compression.

In this prior art, since instruction addresses except those of branch instructions are compressed and stored in the trace memory, the capacity of the trace memory can be decreased. In addition, when compressed difference values are added starting from uncompressed data of the instruction address of a branch instruction, the instruction address can be reconstructed.

In the prior art shown in FIG. 12, however, only branch instructions are detected. If only a certain range of a program is to be repeatedly traced, as in, e.g., section trace, the original address cannot be reconstructed from compressed data. This is because the section trace start instruction address is not a branch instruction and is therefore compressed, like other instruction addresses.

SUMMARY OF THE INVENTION

It is an object of the present invention to provide a program development support apparatus which can compress and reconstruct an instruction address even when a specific range is to be traced starting from a specific instruction code or specific address other than a branch instruction, as in section trace, and can store an enormous amount of trace data even with a limited memory capacity.

In order to achieve the above object, according to the present invention, there is provided a program development support apparatus comprising a CPU (Central Processing Unit) for executing a target program and outputting instruction address/instruction code data, event management means for asserting and outputting a section trace start signal upon detecting that the instruction address/instruction code data from the CPU matches one of a predetermined instruction address and predetermined instruction code set as an event condition in advance, trace data generation means for, when an instruction code of the instruction address/instruction code data from the CPU is a branch instruction, or the section trace start signal from the event management means is active, outputting an uncompressed instruction address as trace data, and when the instruction address of the instruction address/instruction code data is not the branch instruction, and the section trace start signal is not active, generating a plurality of compressed instruction addresses by compressing the instruction address of the instruction address/instruction code data, and then combining the compressed instruction addresses and outputting the compressed instruction addresses as the trace data, and a trace memory for storing the trace data from the trace data generation means.

BRIEF DESCRIPTION OF THE DRAWINGS

FIG. 5 is a view showing a sample program list;

FIGS. 6A to 6I are timing charts showing branch instruction determination operation by the program development support apparatus shown in FIG. 1;

FIG. 7 is a view showing data in a trace memory after branch instruction determination;

FIGS. 9A to 9I are timing charts showing section trace operation by the program development support apparatus shown in FIG. 1;

FIG. 10 is a view showing data in the trace memory after section trace;

DESCRIPTION OF THE PREFERRED EMBODIMENTS

The present invention will be described below in detail with reference to the accompanying drawings.

A program development support apparatus of the present invention prepares an event detection section for detecting a predetermined instruction address or predetermined instruction code externally set in advance and has a mechanism for, when an event is detected, storing in a trace memory an instruction address for storing the detected instruction address or detected instruction code without any compression.

Figure 1:
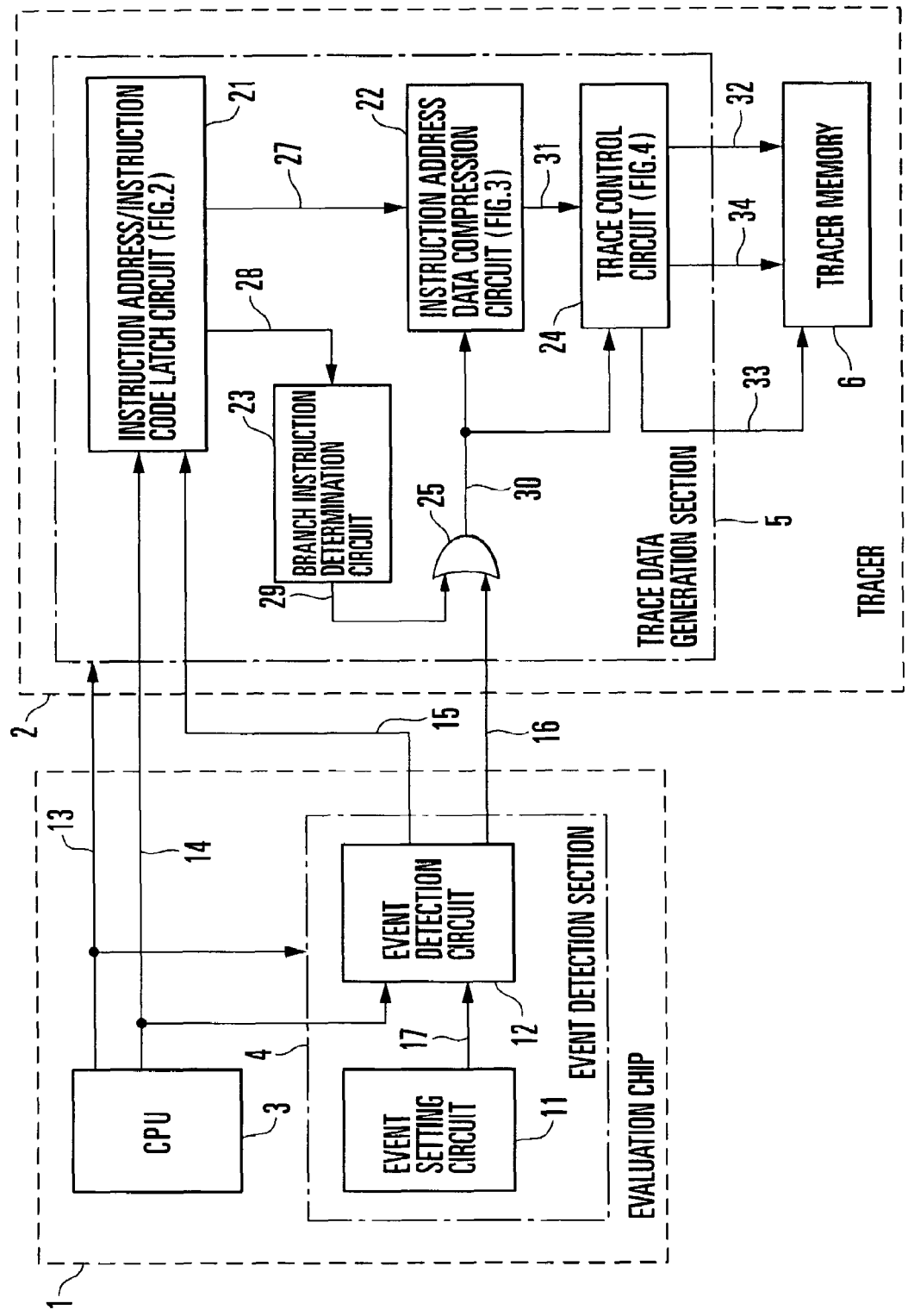
FIG. 1 is a block diagram of a program development support apparatus according to the first embodiment of the present invention.

FIG. 1 shows a program development support apparatus according to an embodiment of the present invention. Referring to FIG. 1, the program development support apparatus has an evaluation chip 1 for executing a target program and a tracer 2 for storing an execution result.

The evaluation chip 1 has a CPU 3 for actually executing the target program, and an event detection section 4 serving as an event management means. The event detection section 4 receives instruction address/instruction code data 14 from the CPU 3 and determines whether the instruction address or instruction code matches a preset event condition. If they match, the event detection section 4 activates a section trace start signal 16 and keeps a section trace period data latch signal 15 active.

The tracer 2 has a trace data generation section 5 and a trace memory 6 for storing trace data. The trace data generation section 5 receives a clock signal 13, instruction address/instruction code data 14, section trace period data latch signal 15, and section trace start signal 16 from the evaluation chip 1. When the instruction address of the instruction address/instruction code data 14 is a branch instruction, or the section trace start signal 16 is active, the trace data generation section 5 writes an instruction address 27 in the trace memory 6 without any compression.

On the other hand, when an instruction code 28 of the instruction address/instruction code data 14 is not a branch instruction, and the section trace start signal 16 is not active, the trace data generation section 5 generates a compressed instruction address 31 corresponding to a difference value obtained by subtracting the instruction address of the preceding instruction address/instruction code data from the instruction address 27 of the current instruction address/instruction code data 14. The trace data generation section 5 also combines a plurality of compressed instruction addresses 31 corresponding to a plurality of consecutive instruction address/instruction code data 14 in accordance with the bit width of the trace memory 6 and writes the combined data in the trace memory 6 as trace data 32.

The event detection section 4 has an event setting circuit 11 and event detection circuit 12. When an instruction address or instruction code is externally set in advance as an event condition, the event setting circuit 11 holds the active period of the data latch signal 15. Upon detecting that the set value of an instruction address or instruction code transferred from the event setting circuit 11 by an event setting data signal 17 matches the instruction address or instruction code output from the CPU 3, the event detection circuit 12 activates the section trace start signal 16 and also activates the data latch signal 15 during the period set in the event setting circuit 11. When no event condition is set, the data latch signal 15 continuously outputs the active level.

The trace data generation section 5 comprises an instruction address/instruction code latch circuit 21, instruction address data compression circuit 22, branch instruction determination circuit 23, trace control circuit 24, and 2-input OR circuit 25.

The instruction address/instruction code latch circuit 21 latches the instruction address/instruction code data 14 output from the CPU 3 in the evaluation chip 1 on the basis of the data latch signal 15 in synchronism with the clock signal 13 and outputs the instruction address 27 and instruction code 28.

The instruction address data compression circuit 22 receives the instruction address 27 from the instruction address/instruction code latch circuit 21 and an uncompressed data selection signal 30 from the 2-input OR circuit 25. When the uncompressed data selection signal 30 is active, the instruction address data compression circuit 22 outputs the instruction address 27 as the compressed instruction address 31 without any compression. On the other hand, when the uncompressed data selection signal 30 is not active, the instruction address data compression circuit 22 outputs difference data obtained by subtracting the immediately preceding instruction address from the current instruction address as the compressed instruction address 31.

The branch instruction determination circuit 23 receives the instruction code 28 from the instruction address/instruction code latch circuit 21 and determines whether the instruction code 28 is a branch instruction. If it is determined that the instruction code is a branch instruction, the branch instruction determination circuit 23 asserts a branch instruction detection signal 29 (high level).

The trace control circuit 24 receive the compressed instruction address 31 from the instruction address data compression circuit 22 and the uncompressed data selection signal 30 from the 2-input OR circuit 25. When the uncompressed data selection signal 30 is active, the trace control circuit 24 outputs the compressed instruction address 31 as the trace data 32 without any processing. On the other hand, when the uncompressed data selection signal 30 is not active, the trace control circuit 24 combines a plurality of continuously received compressed instruction addresses 31 in accordance with the bit width of the trace memory 6 and outputs the combined data as the trace data 32, and additionally, outputs to the trace memory 6 a trace data write signal 34 for designating a write of the trace data and a trace memory address 33 for designating a storage address.

The 2-input OR circuit 25 asserts and outputs the uncompressed data selection signal 30 when at least one of the branch instruction detection signal 29 from the branch instruction determination circuit 23 and the section trace start signal 16 from the event detection section 4 is active (high level).

Figure 2:
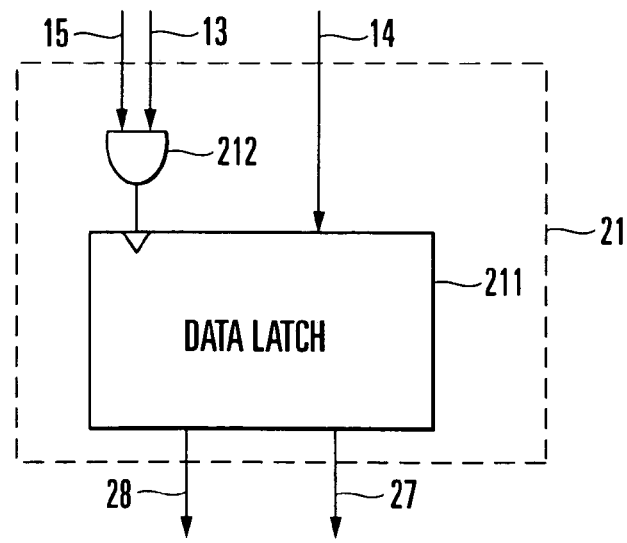
FIG. 2 is a circuit diagram of an instruction address/instruction code latch circuit shown in FIG. 1.

Details of the instruction address/instruction code latch circuit 21 will be described next with reference to FIG. 2. Referring to FIG. 2, the instruction address/instruction code latch circuit 21 holds the instruction address/instruction code data 14 by a data latch 211 and extracts the instruction address 27 and instruction code 28.

The instruction address/instruction code data 14 is basically latched by the data latch 211 in synchronism with the instruction address/instruction code data 14 in accordance with the clock signal 13 output from the CPU 3. In this case, the latch operation is ON/OFF-controlled by ON/OFF-controlling the gate of an AND circuit 212 by the data latch signal 15 from the event detection circuit 12. In the section trace, the data latch signal 15 is active only during the period from the start to the end of section trace. In the normal trace state, the data latch signal 15 always maintains the active level.

Figure 3:
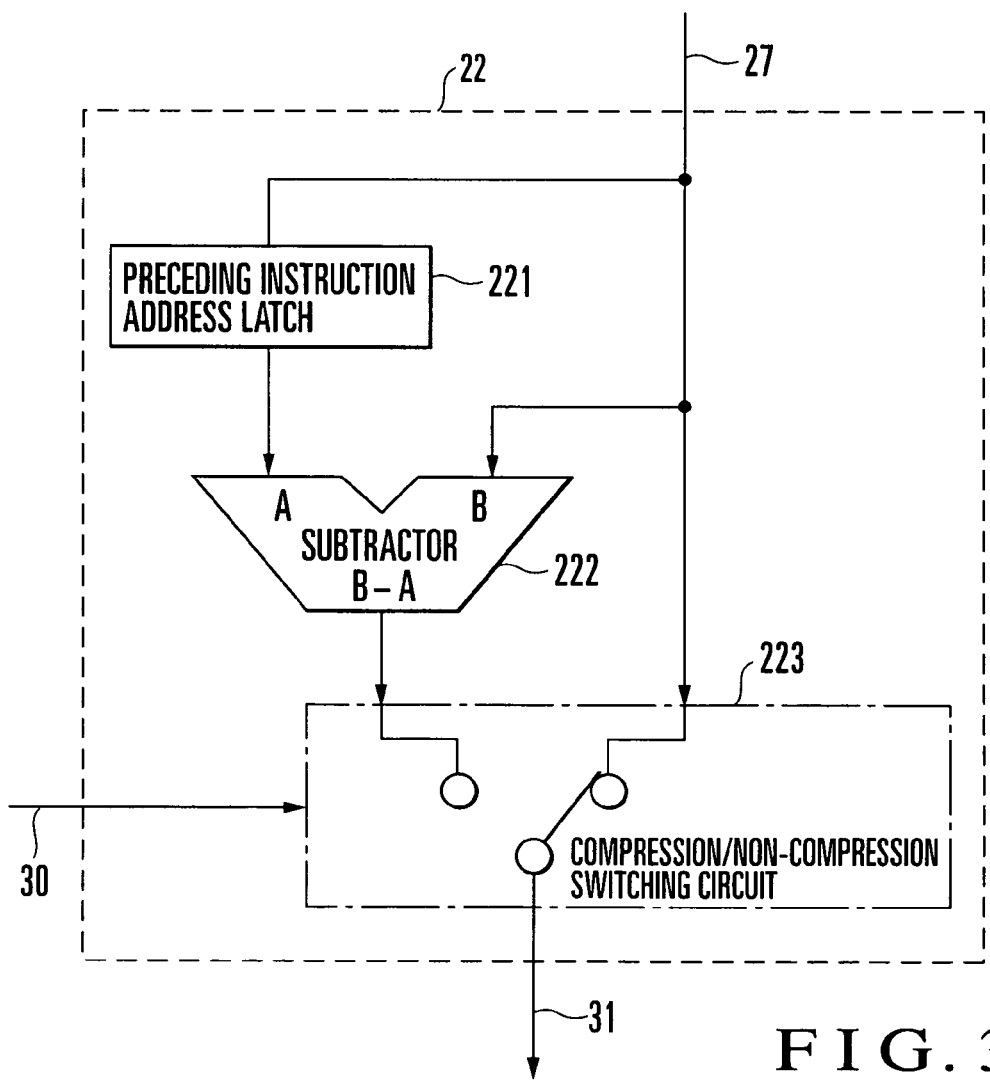
FIG. 3 is a circuit diagram of an instruction address data compression circuit shown in FIG. 1.

Details of the instruction address data compression circuit 22 will be described next with reference to FIG. 3. As an instruction address compression method, in the non-compression mode, the instruction address value (e.g., 32-bit length) is recorded as a base address, and in the compression mode, the difference value (e.g., 8-bit length) between the immediately preceding instruction address value and the current instruction address value is recorded as compressed instruction address data. The instruction address data compression circuit 22 comprises a preceding instruction address latch 221, subtractor 222, and compression/non-compression switching circuit 223.

The preceding instruction address latch 221 generates difference data between the current instruction address value and the preceding instruction address value as compressed instruction address data. The subtractor 222 calculates the difference between the current instruction address and the output from the preceding instruction address latch 221 to generate compressed data. The compression/non-compression switching circuit 223 switches between the compressed data from the subtractor 222 and the instruction address data 27 as uncompressed data. When the uncompressed data selection signal 30 is asserted, the uncompressed instruction address 27 is output from the compression/non-compression switching circuit 223 as the compressed instruction address 31.

Figure 4:
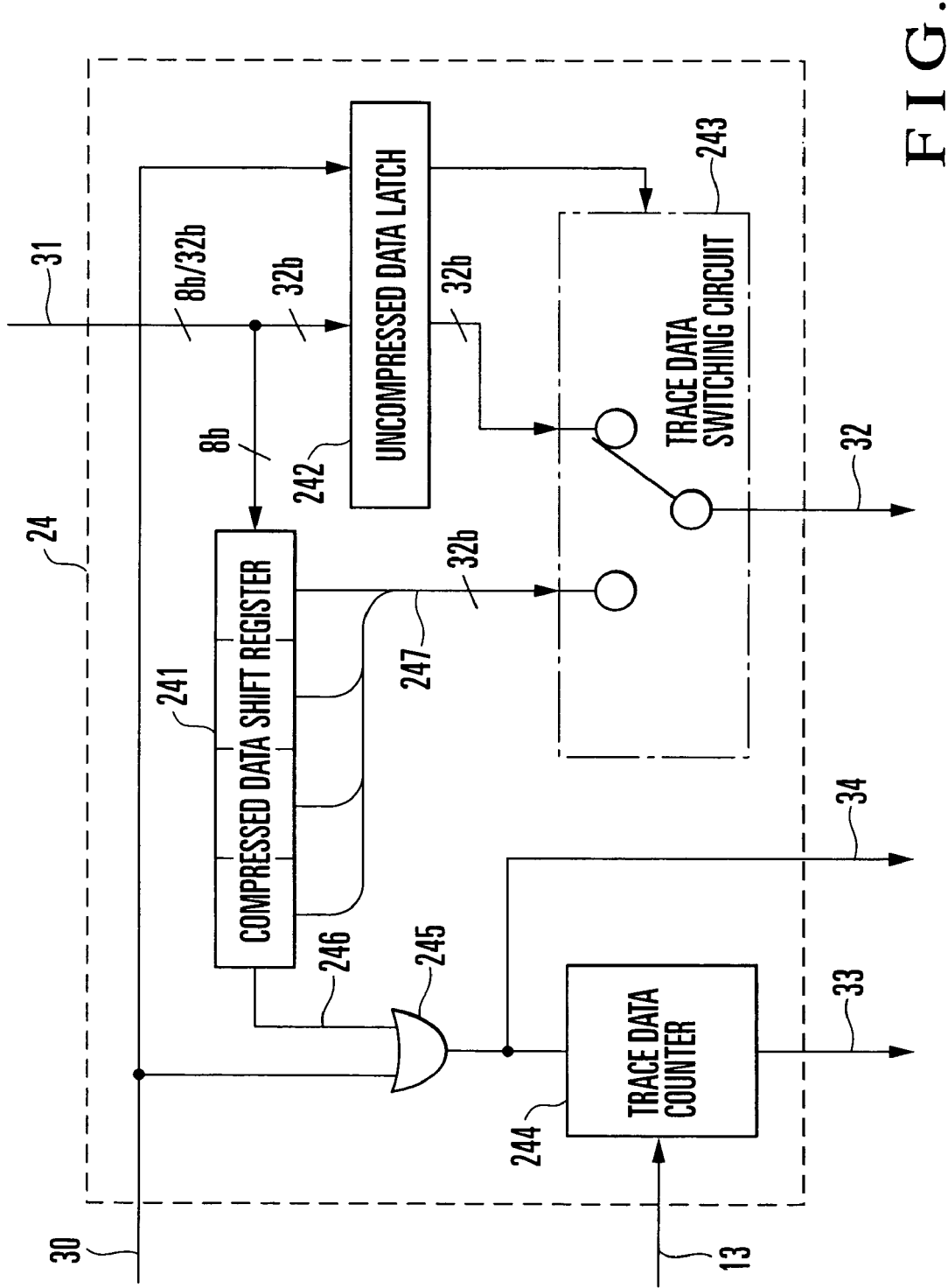
FIG. 4 is a circuit diagram of a trace control circuit shown in FIG. 1.

Details of the trace control circuit 24 will be described next with reference to FIG. 4. The trace control circuit 24 comprises a compressed data shift register 241, uncompressed data latch 242, trace data switching circuit 243, trace data counter 244, and 2-input OR circuit 245. The trace control circuit 24 having these components generates the trace memory address 33 to be written in the trace memory 6, the trace write signal 34 for enabling write operation, and a timing signal for finally writing the data in the trace memory 6. The trace control circuit 24 also aligns the compressed instruction address signal 31 generated by the instruction address data compression circuit 22 to the bit width of the trace memory 6.

When the trace write signal 34 is active, the trace data counter 244 increments by one in synchronism with the leading edge of the clock signal 13. The trace memory address 33 output from the trace data counter 244 represents an address at which the trace data 32 is to be sequentially recorded in a frame of the trace memory 6. The trace memory address 33 changes in synchronism with the write timing to the trace memory 6 and is normally incremented immediately after the write in the trace memory 6 is ended. The write timing will be described later.

The operation of aligning the compressed data to the bit width of the trace memory 6 will be described next. To align compressed data having a smaller bit width than a base address to the bit width of the trace memory 6, the compressed data shift register 241 is used. When the data of the compressed instruction address 31 is compressed, the compressed data shift register 241 stores the data while sequentially shifting it until data that fill the bit width of the trace memory are stored. Referring to FIG. 4, since the data width ratio of "uncompressed data" to "compressed data" is 4:1, the compressed data shift register 241 sequentially stores compressed data of four instruction addresses at maximum.

When the fourth compressed data is written in the compressed data shift register 241, an alignment completion signal 246 is asserted and recorded in the trace memory 6 through the 2-input OR circuit 245 as data of one frame. Simultaneously, the contents in the compressed data shift register 241 are cleared to prepare for storage of the next compressed data.

The instruction address 27 as uncompressed data or aligned compressed data 247 that has aligned to the bit width by the compressed data shift register 241 is selected, as the trace data to be output 32, by the trace data switching circuit 243 in accordance with a signal output from the uncompressed data latch 242. The uncompressed data latch 242 outputs a signal obtained by temporarily latching the uncompressed data selection signal 30 and adjusting its timing to the trace data switching circuit 243.

Data compression/non-compression operation for a branch instruction and normal instruction in the program development support apparatus having the above arrangement will be described next.

FIG. 5 shows a sample program list for explaining trace operation. This sample program is a partial extraction from a large-scale program. Of instructions 1 to 27, instructions 3 to 26 form a single loop so that the program repeatedly branches to instruction 3 an arbitrary number of times in accordance with a condition branch instruction of instruction 26. The instruction address space has 32 bits. The instruction code length is 4 or 2 bytes. The trace memory uses a ring buffer having addresses (00000) to (000FF).

Figure 12:
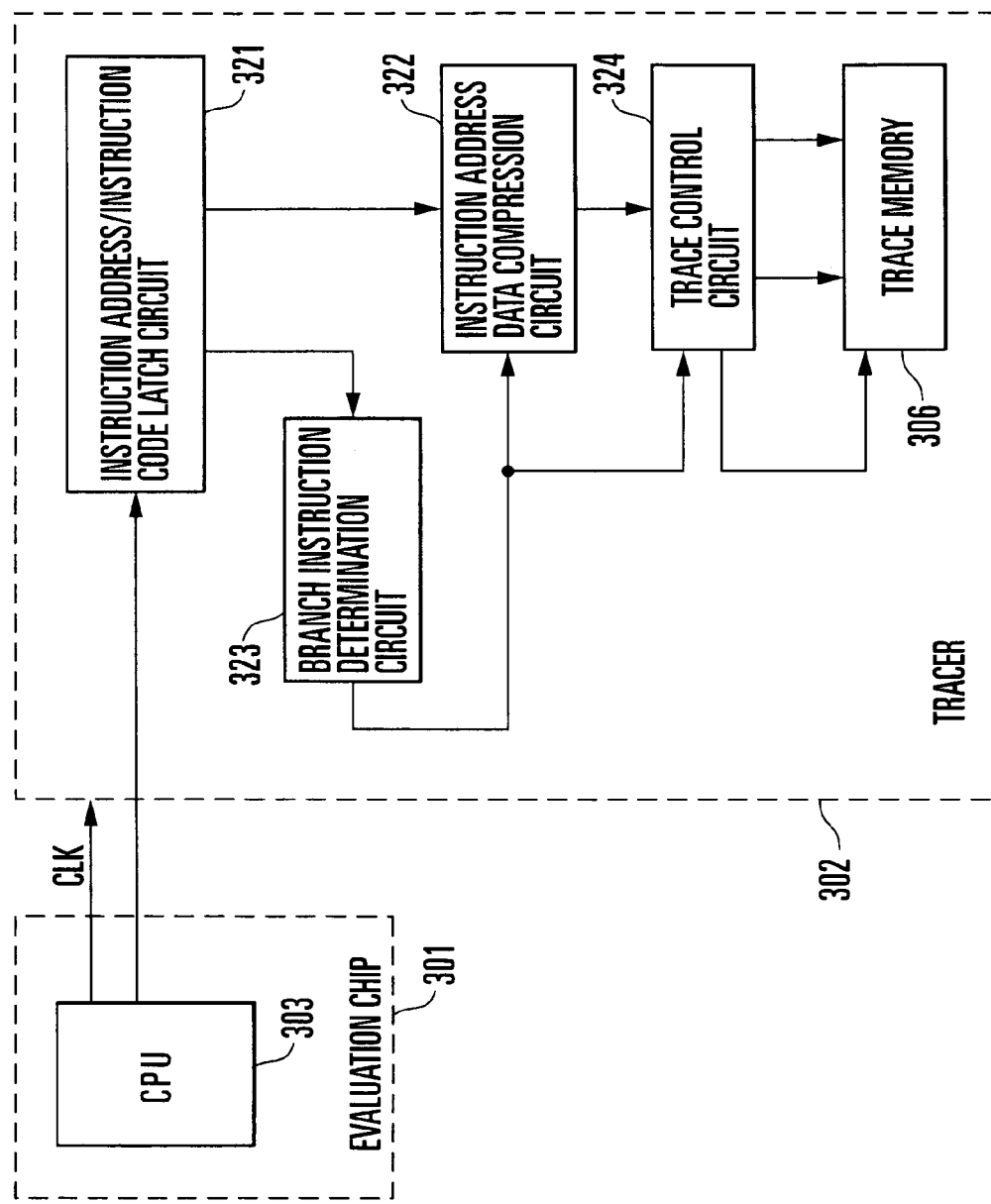
FIG. 12 is a block diagram of a conventional program development support apparatus.

FIGS. 6A to 6I show operation timings in determining a branch instruction. The operation shown in FIGS. 6A to 6I does not use section trace and is basically the same as that of the prior art shown in FIG. 12.

When no event condition is set in the event setting circuit 11, and section trace is not used, the data latch signal 15 is always active. The instruction address/instruction code latch circuit 21 latches the instruction address/instruction code data 14 sequentially from instruction 1 in response to each clock signal 13 and outputs the instruction address 27 (FIGS. 6A to 6C).

When the program progresses to instruction 26 (FIG. 5) as a branch instruction, the instruction address/instruction code data 14 output from the CPU 3 changes to instruction 3. At this time, the branch instruction determination circuit 23 determines that the branch instruction has been executed immediately before and asserts the branch instruction detection signal 29 (FIG. 6D).

The instruction address data compression circuit 22 outputs, as the compressed instruction address 31, uncompressed data of the instruction address of instruction 3 in place of the difference between immediately preceding address values, i.e., compressed data that has been output (FIG. 6E).

When the branch instruction detection signal 29 is activated, the trace control circuit 24 asserts the trace data write signal 34 and outputs it to the trace memory 6 during a 2-clock period (FIG. 6H). The trace memory address 33 is incremented to (00000) in synchronism with the first leading edge of the clock signal 13 (FIG. 6I). The instruction address of instruction 3 is written as uncompressed data at a corresponding frame address of the trace memory 6. When the write to the frame is ended, for the write to the next frame, the trace memory address 33 is incremented by one to (00001) in synchronism with the second leading edge of the clock signal 13 during the active period of the trace data write signal 34 (FIG. 6I).

After that, in accordance with instruction 4, the instruction address data compression circuit 22 calculates "instruction address of instruction 4"—"instruction address of instruction 3" and compresses the result to lower 1-byte data. In a similar manner, compressed data are generated in accordance with instructions 5, 6, and 7 and sequentially sent to the compressed data shift register 241 of the trace control circuit 24. When the compressed data of instruction 7 is input, the compressed data shift register 241 is filled and outputs the alignment completion signal 246 (FIG. 6G). The trace control circuit 24 generates the trace data write signal 34 in accordance with the alignment completion signal 246 and writes in the trace memory 6 the trace data 32 obtained by combining the compressed data of four instructions 4 to 7 (FIGS. 6G and 6H). After that, the trace memory address 33 is incremented by one to (00002) in synchronism with the leading edge of the clock signal 13. This operation is continued until the next branch instruction is detected.

FIG. 7 shows the data state in the trace memory 6 after branch instruction determination. This data state is the execution result of the sample program recorded in the trace memory 6 by the above operation.

In the trace data stored in the trace memory 6, data corresponding to instruction 3 has a compression flag "0" which represents that the instruction address can be read out as uncompressed data. For each of the remaining instructions, since an increment (matching the number of bytes of instruction code) from the immediately preceding instruction address is stored, a reconstructed address can be obtained by reading out the instruction address and adding it to the preceding instruction address.

Figure 8:
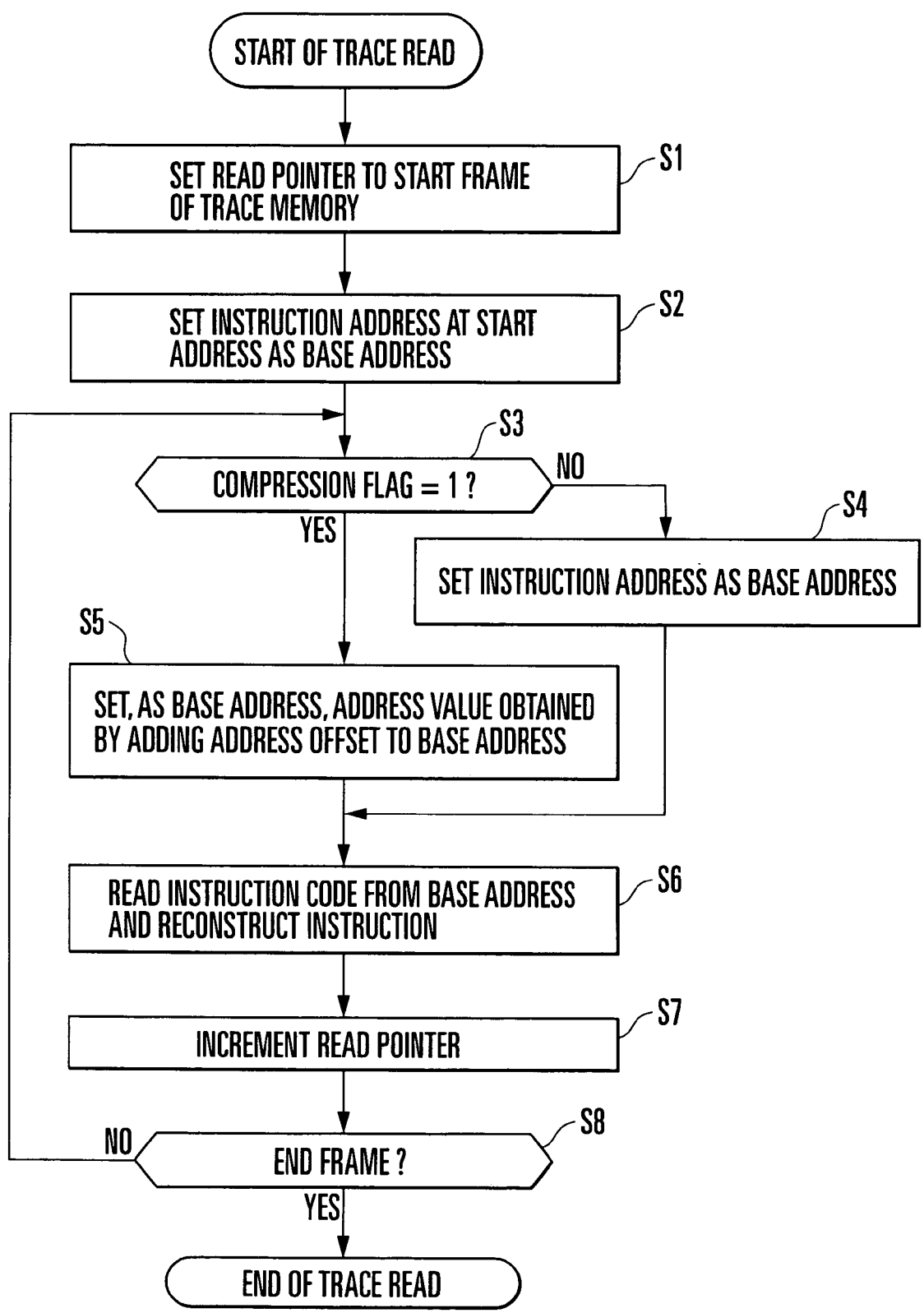
FIG. 8 is a flow chart showing a trace data read procedure.

Trace data read operation will be described next in detail with reference to FIG. 8.

Steps S1 to S3 correspond to initialization of the read operation. In step S1, the read pointer is set to the start frame of the trace memory 6. In step S2, the instruction address at the start frame is set as a base address. It is determined in step S3 whether the compression flag is "1". If NO in step S3, the flow advances to step S4. If YES in step S3, the flow advances to step S5.

In step S4, the trace data is latched from the start frame of the trace memory 6, and the instruction address at the uncompressed frame is set as a base address. In step S6, the instruction code of the address is read from the base address, and the instruction is displayed. In step S7, the read pointer is incremented, and the next trace frame is read out. At step S8, it is determined whether the end of the frame is reached.

If YES in step S3, the frame data is compressed data. In step S5, an offset is added to the base address to set a new base address. The flow advances to step S6 to perform the same operation as described above. The instruction addresses are reconstructed according to the above procedure to obtain the reconstructed addresses shown in FIG. 7.

Operation using section trace will be described next with reference to FIGS. 9A to 9I.

In section trace, trace is performed only for a specific range of a program. As a detailed example, operation of performing trace only for the range of four steps from instruction 4 to 7 in the sample program list shown in FIG. 5, where the data is written, will be described.

The instruction address/instruction code data 14 output from the CPU 3 is sampled by the data latch 211 of the trace data latch circuit 21 only during the period when instructions 4 to 7 are being executed on the basis of the active period of the data latch signal 15, that is set in the event setting circuit 11. For this reason, as the instruction address 27, only the instruction addresses of instructions 4 to 7 are output from the instruction address/instruction code latch circuit 21 to the instruction address data compression circuit 22 (FIG. 9C).

At this time, the section trace start signal 16 representing the section trace start position is asserted during the 2-clock period from the start of execution of instruction 4 (FIG. 9D). The section trace start signal 16 is input to the 2-input OR circuit 25 together with the branch instruction detection signal 29. When the section trace start signal 16 is asserted (high level), the uncompressed data selection signal 30 output from the 2-input OR circuit 25 is asserted independently of whether the instruction is a branch instruction. As a result, the instruction address of instruction 4 is output during the low level period of the clock signal 13 as uncompressed data.

Generation of compressed data of instructions 5 to 7 and combination to trace data are the same as in FIGS. 6A to 6I, and a description thereof will be omitted.

FIG. 10 shows the data state in the trace memory after section trace. This data state is the execution result of section trace of the sample program recorded in the trace memory 6 by the above operation. Data corresponding to instruction 4 as trace data has a compression flag "0" which represents that the instruction address is uncompressed. The trace data read in section trace is also the same as in FIG. 8.

Figure 11:
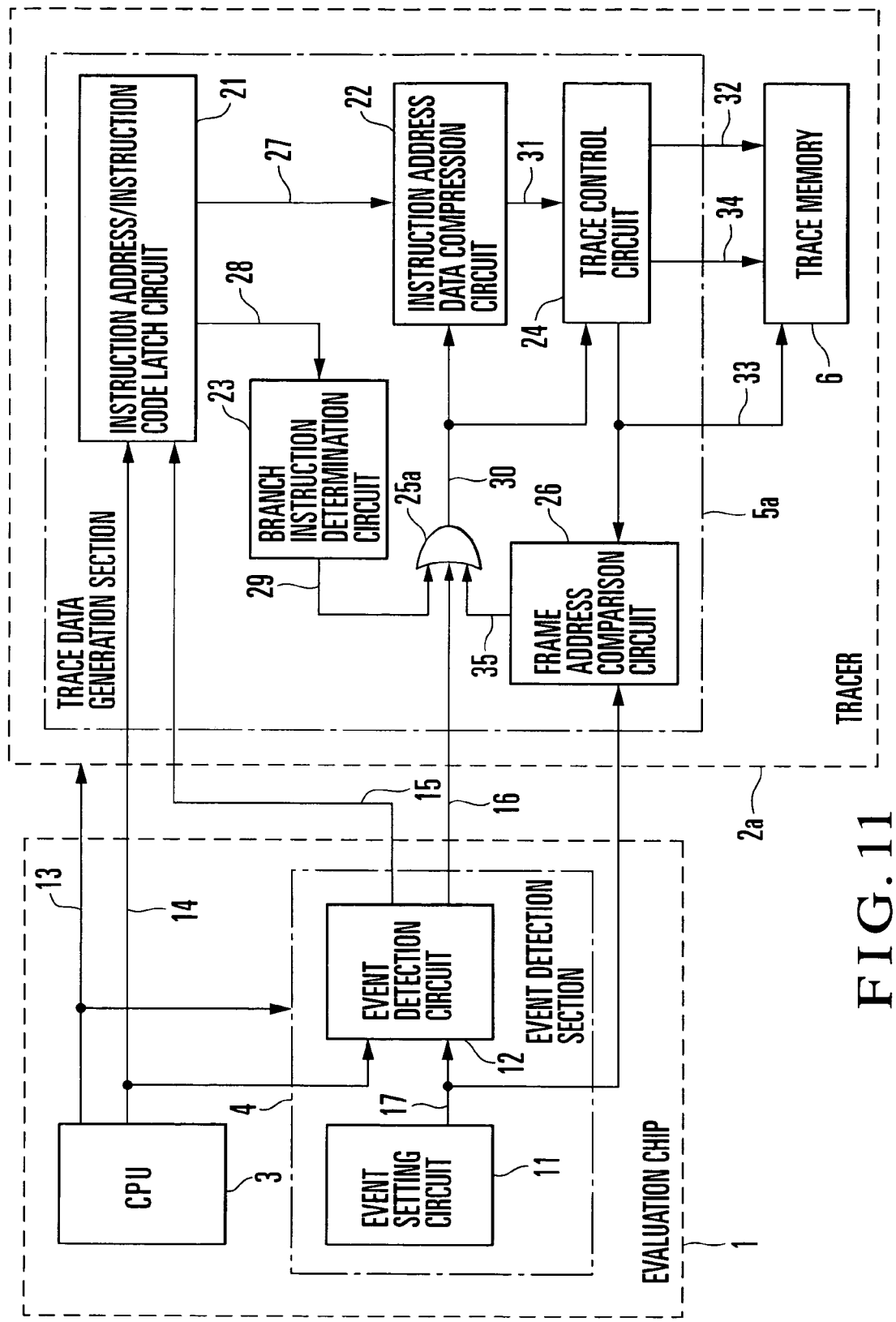
FIG. 11 is a block diagram of a program development support apparatus according to the second embodiment of the present invention.

FIG. 11 shows a program development support apparatus according to the second embodiment of the present invention. The basic arrangement of the program development support apparatus shown in FIG. 11 is the same as in the first embodiment shown in FIG. 1 except that a frame address comparison circuit 26 is added, and a 3-input OR circuit 25*a* is used in place of the 2-input OR circuit 25.

The frame address comparison circuit 26 receives an event setting data signal 17 and trace memory address 33, and when predetermined portions of the two data match, asserts a frame match signal 35. The 3-input OR circuit 25*a* receives the frame match signal 35 in addition to a branch instruction detection signal 29 and section trace start signal 16 and, when at least one of these signals is active, asserts and outputs an uncompressed data selection signal 30.

When, e.g., a value that matches the trace memory address 33 at a predetermined frame interval is set in an event setting circuit 11 as an event condition, uncompressed trace data can be embedded at an arbitrary frame. In this embodiment, even when the section trace range exceeds the maximum number of frames of the trace memory (in the example used for explanation, the frames of the trace memory are 00000 to 000FF), uncompressed data can be embedded into trace data. Hence, even in this case, the original instruction address can be reconstructed from compressed trace data using the uncompressed data as a base instruction address.

As has been described above, according to the present invention, an instruction address, which is not to be compressed and is to be used as a base address in reconstructing compressed trace data, can be externally set in the event detection section. As a consequence, even when the trace data contains no branch instruction, as in section trace, the base address as the base of reconstruction can be left in the trace data, and the instruction address can be correctly reconstructed.

Not only in section trace but also in trace of DMA (Direct Memory Access) or interrupt of the CPU, address information of an instruction for changing the program execution order, although it contains no branch instruction, or an instruction for performing a bus access different from the CPU operation is set. In this case as well, since an instruction address can be stored in the trace memory as uncompressed data and used as a base address in reconstructing the instruction address, the instruction address can be correctly reconstructed.

What is claimed is:

1. A program development support apparatus comprising:
   a CPU (Central Processing Unit) for executing a target program and outputting instruction address/instruction code data;
   event management means for asserting and outputting a section trace start signal upon detecting that the instruction address/instruction code data from said CPU matches at least one of a predetermined instruction address and a predetermined instruction code set as an event condition in advance, the predetermined instruction code being different from a branch instruction;
   trace data generation means for;
   outputting an uncompressed instruction address as trace data when an instruction code of the instruction address/instruction code data from said CPU is a branch instruction;
   outputting the uncompressed instruction address as the trace data when the section trace start signal from said event management means is active;
   generating a plurality of compressed instruction addresses by compressing the instruction address of the instruction address/instruction code data, combining the compressed instruction addresses, and outputting the compressed instruction addresses as the trace data when the instruction address of the instruction address/instruction code data is not a branch instruction and the section trace start signal is not active; and
   a trace memory for storing the trace data from said trace data generation means.

2. The apparatus according to claim 1, wherein said event management means keeps a data latch signal active during a predetermined period and outputting the data latch signal; and said trace data generation means receives the instruction address/instruction code data from said CPU and the section trace start signal from said event management means and, when the data latch signal from said event management means is active, latches the instruction address/instruction code data.

3. The apparatus according to claim 2, wherein said event management circuit means comprises:
   event setting means in which event setting data containing the predetermined instruction address/instruction code as the event condition and the active period of the data latch signal are set in advance; and
   event detection means for, upon detecting that the instruction address/instruction code contained in the event setting data output from said event setting means matches the instruction address/instruction code of the instruction address/instruction code data from said CPU, asserting and outputting the section trace start signal and asserting the data latch signal during the active period set in said event setting means and outputting the data latch signal.

4. The apparatus according to claim 2, wherein said trace data generation means comprises:
   instruction address/instruction code latch means for latching the instruction address/instruction code data from said CPU during the active period of the data latch signal and outputting the instruction address/instruction code;
   instruction address data compression means for, when a received uncompressed data selection signal is active, outputting the instruction address from said instruction address/instruction code latch means as the compressed instruction address, and when the uncompressed data selection signal is not active, outputting difference data obtained by subtracting an immediately preceding instruction address from a current instruction address as the compressed instruction address;
   branch instruction determination means for determining whether the instruction code from said instruction address/instruction code latch means is the branch instruction, and upon determining that the instruction code is the branch instruction, asserting and outputting a branch instruction detection signal;
   trace control means for, when the received uncompressed data selection signal is active, outputting the compressed instruction address from said instruction address data compression means as trace data, and when the uncompressed data selection signal is not active, combining a plurality of continuously received compressed instruction addresses in accordance with a bit width of said trace memory and outputting the combined instruction addresses as the trace data, and outputting a trace data write signal for instructing said trace memory to write the trace data and a trace memory address for designating a storage address of said trace memory; and,
   OR means for asserting and outputting the uncompressed data selection signal when at least one of the branch instruction detection signal from said branch instruction determination means and the section trace start signal from said event management means is active.

5. The apparatus according to claim 4, wherein said apparatus further comprises:
   frame address comparison means for asserting and outputting a frame match signal when the instruction address/instruction code contained in the event setting data output from said event setting means matches the trace memory address from said trace control means; and,
   said OR means asserting and outputting the uncompressed data selection signal when at least one of the branch instruction detection signal from said branch instruction determination means, the section trace start signal from said event detection means, and the frame match signal from said frame address comparison means is active.

* * * * *